UNITED STATES PATENT OFFICE 2,298,943

PROCESS OF RECLAIMING WAX FROM WASTE WAXED PAPER

Perlie E. Howard, Nashua, N. H.

No Drawing. Application May 15, 1939, Serial No. 273,709

2 Claims. (Cl. 196—17)

This invention relates to a process of reclaiming wax and paper stock from waste waxed paper. The main object of the invention is to recover wax free from extraneous color, taste and odor, and suitable for reuse for all purposes to which virgin wax may be applied. An equally important object is the recovery of paper stock in such condition that it may be used again in the manufacture of paper of equal quality as the original.

Another object of the invention is to recover substantially all of the wax applied to the waste paper to be treated. I extract about 99% of the wax. Recovered paper stock cannot be used again for paper making where the recovery method employed fails to extract substantially all or more than about eighty-five (85) % of the wax originally contained therein, due to the fact that the wax remaining in the stock interferes with the operation of the paper making machinery and causes spots in the paper. If wax is present in the recovered paper stock in quantities sufficient to interfere with the continued operation of paper making machinery, it is not commercially economical to use such recovered stock. It is necessary to recover at least 95% of the original wax in order to render the reclaimed paper stock useful for paper making.

Another object of the invention is to recover the wax without, at the same time, freeing the ink from the paper being treated. Printed waxed papers are printed before being waxed. I avoid the use of solvents and other agents which would free the ink and the wax and thereby contaminate the wax and render it unfit for use as virgin wax.

Another object of my invention is to preserve the strength of the paper stock. To this end, the shredding of the paper must be controlled carefully, and the time of treatment and temperature of the dewaxing compound must be regulated within relatively narrow limits.

If soft water is used, the compound is made in the proportion of 2 ounces of bicarbonate of soda to 1 gallon of water. If the water is hard, the soda content should be increased. Water tests should be made to determine the proper proportions.

The dewaxing compound is heated by indirect heat to not less than 200° F. or more than 205° F. to obtain perfect results. Wax melts at about 180°, but in order to conduct the process at practical speeds and to produce best results, I prefer to heat the compound to 200°–205° F. Higher temperature is injurious to the paper stock.

Proper shredding of the waxed paper is essential. It should not be ground or pulped. I prefer to shred the paper coarsely into pieces. The sizes of the pieces range from one-sixteenth square inch to nine-sixteenths square inch in area, that is, the dimensions generally range from one-quarter to three-quarters of an inch. The pieces should not be large enough to become wadded and thus retard freeing of the wax, nor should they be so small that they tend to form into too solid a mass.

The shredded waste paper stock is introduced into the dewaxing compound in the proportion of approximately one pound of paper stock, dry weight, to two gallons of dewaxing compound. The compound must not be overloaded.

The shredded paper is immersed in the compound and retained seven to nine inches below the surface of the compound, to prevent the paper from mixing with the freed wax. Any suitable screen or perforated metal plate may be fixed in the compound container to prevent rising of the paper under treatment.

The temperature of the compound and immersed paper stock is maintained at approximately 200°–205° F. by indirect heat, by means of steam heating coils or a jacketed tank. The admission of free steam or hot water directly to the tank contents results in creating currents in the mass, which interferes with the efficiency of the dewaxing operation. While agitation of the mass below the screen is necessary after proper temperature has been attained, the agitation should be periodic and not constant. One minute of agitation and several minutes at rest are recommended. The compound works on the paper at rest and the agitation is only required and desirable to the extent needed to free the wax and allow it to rise through the screen to the relatively quiet wax collecting zone above the screen at the top of the fluid. Preferably I agitate the mass for about one minute, with the temperature at about 200° F., and shut off the agitator and allow the mass to rest for about fourteen minutes, repeating this cycle about six times, or until the wax has been freed and has risen.

After the wax has been freed from the paper stock and has risen through the screen into the relatively quiet collecting zone at the top of the fluid, the compound is cooled or allowed to cool to 70° or 75° F. in order to solidify the freed wax which may then be removed in cake form. Cooling by artificial means speeds the operation.

The process described does not remove the ink from waxed printed paper stock. The reclaimed paper stock resulting from the practice of my method may be de-inked and bleached by any of the well known means used by paper manufacturers. The essential feature of my invention is the recovery of substantially all the wax, approximately 99% or more, free from extraneous color, taste, odor, and foreign matter, without impairing the quality or character of the paper stock for reuse in the production of paper of the original quality and character.

One form of apparatus suitable for practicing my invention is shown in my copending appplication, Serial No. 181,935, filed December 27, 1937, of which this application is a continuation-in-part.

I claim:

1. The process of reclaiming in substantially its original pure condition substantially all of the wax present in waste waxed paper stock without removal of printers' ink from the stock if printed and without impairing the original quality of the paper stock fibres for reuse, said process comprising coarsely shredding the paper to provide relatively uniform sized pieces generally ranging from one-quarter to three-quarters of an inch square, immersing the shredded paper in a bath of dewaxing liquid and retaining the paper sufficiently below the top of the bath to provide a relatively quiet wax collecting zone at the top of the bath above the immersed paper, said bath consisting essentially of water and bicarbonate of soda in the proportion of approximately two ounces of bicarbonate of soda to one gallon of water, the shredded paper being in the proportion of not to exceed approximately one pound of paper stock, dry weight, to two gallons of the dewaxing compound, subjecting the mass to indirect heat to attain a temperature sufficient to melt the wax but not to exceed 205° F., causing the wax to melt, intermittently agitating the mass after coming to temperature to free the melted wax and to cause it to rise through the shredded paper into said zone, and removing the separated wax from said zone.

2. The process of reclaiming in substantially its original pure condition substantially all of the wax present in waste waxed paper stock without removal of printer's ink from the stock and without impairing the original quality of the paper stock fibres for reuse, comprising coarsely shredding the paper to provide relatively uniform sized pieces generally ranging from one-quarter to three-quarters of an inch in area, immersing the shredded paper in a bath of dewaxing liquid and retaining the paper sufficiently below the top of the bath to provide a wax collecting zone at the top of the bath and to prevent mixing of paper and freed wax, said bath comprising water and bicarbonate of soda in the proportion of approximately two ounces of bicarbonate of soda to one gallon of water, subjecting the mass to indirect heat to attain a temperature of 200°–205° F. to cause the wax in the mass to melt, thereafter intermittently agitating the mass to free the melted wax and to cause it to rise through the shredded paper and into said collecting zone, and finally removing the wax from said zone.

PERLIE E. HOWARD.